Nov. 29, 1938.    M. H. GRAHAM    2,138,674
AUTOMATIC TOASTER
Original Filed March 24, 1932    4 Sheets-Sheet 1

INVENTOR
MAURICE H. GRAHAM
By Paul, Paul & Moore
ATTORNEYS

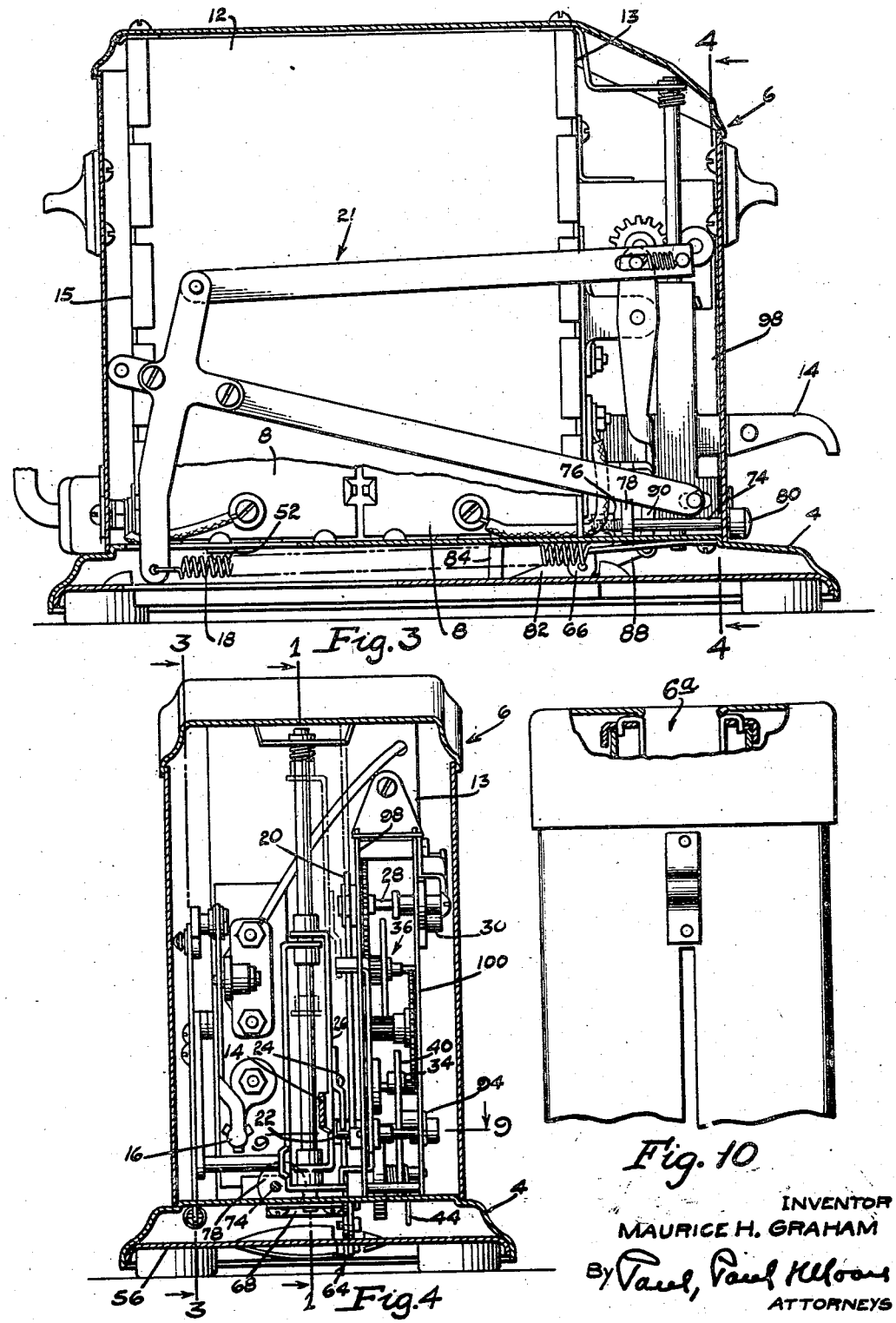

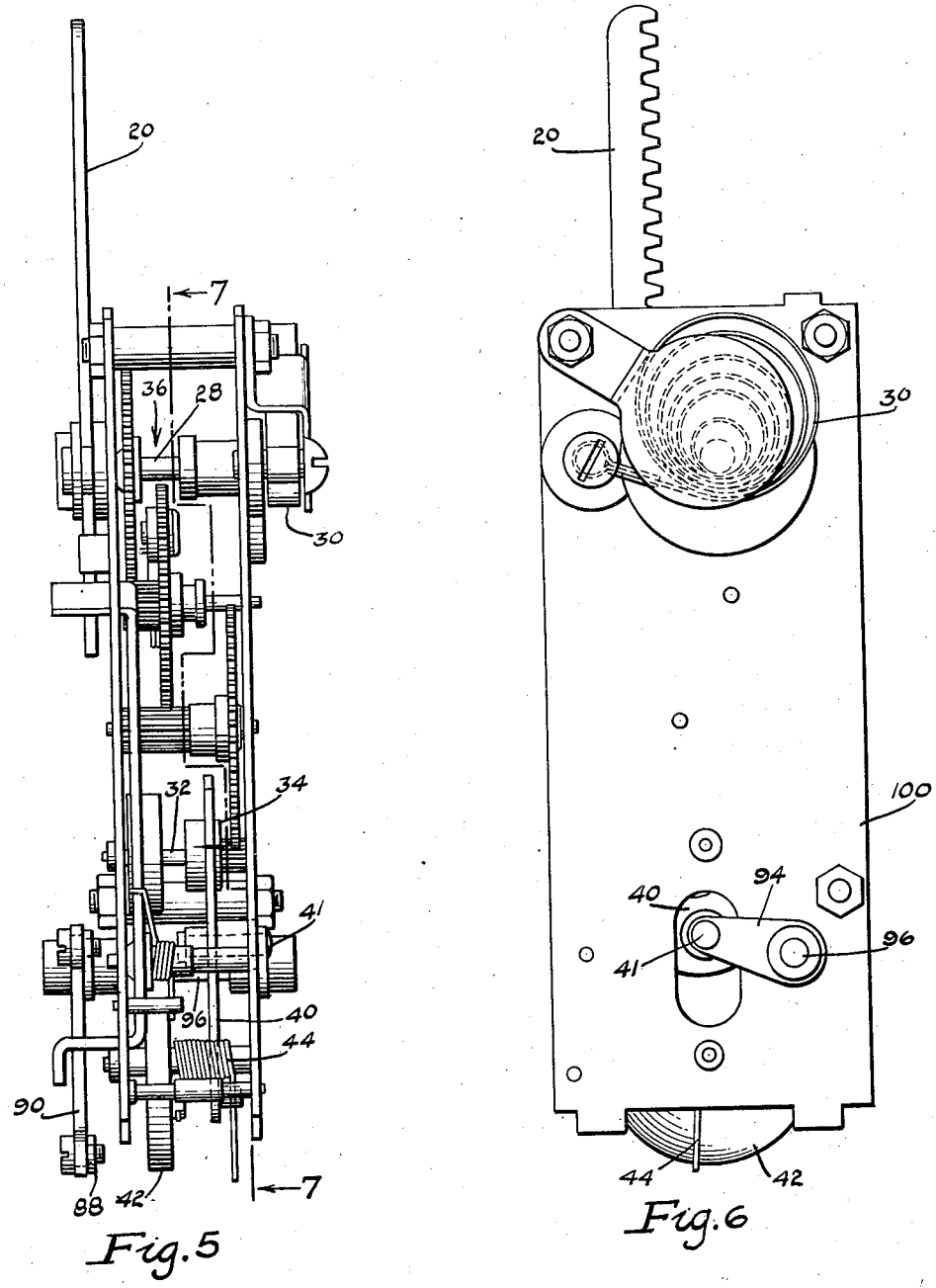

Nov. 29, 1938.   M. H. GRAHAM   2,138,674
AUTOMATIC TOASTER
Original Filed March 24, 1932   4 Sheets-Sheet 4

INVENTOR
MAURICE H. GRAHAM
BY Paul, Paul Nelson
ATTORNEYS

Patented Nov. 29, 1938

2,138,674

UNITED STATES PATENT OFFICE 2,138,674

AUTOMATIC TOASTER

Maurice H. Graham, St. Louis Park, Minn., assignor to McGraw Electric Company, Chicago, Ill., a corporation of Delaware Continuation of application Serial No. 600,913, March 24, 1932. This application March 13, 1933, Serial No. 660,574

31 Claims. (Cl. 219—19)

This is a continuation of my co-pending application Serial No. 600,913, filed March 24, 1932.

The present invention concerns itself with toasters and more particularly with bread toasters which are automatically operative to control the toasting operation.

Various types of automatic toasters have heretofore been proposed. One type includes a clock mechanism with manual means for regulating the same but it is difficult or impossible to obtain uniform toast with it since the oven temperature varies greatly with successive toasting operations and varying time intervals therebetween. In other types of automatic toasters the surface temperature of the bread, its moisture content, and/or its interior temperature have been utilized to control or time the toasting operation.

Again, a type of toaster has been proposed wherein the action of a clockwork or other timing mechanism serving to terminate the toasting of bread slices is automatically controlled or regulated by means of a thermally responsive device affected by oven temperature, and it is with such general type of automatic toaster that this invention is more specifically concerned. Previous toasters of this type have not been successful because of the fact that they will not produce uniform toast during operation in which there are varying time intervals between successive toasting operations.

It is a broad purpose of this invention to produce a thermostatically controlled automatic toaster which will be operative to produce substantially uniform toast irrespective of the temperature of the toasting space within the oven of the toaster at the start of any given toasting operation, and irrespective of the duration of the time intervals between successive toasting operations.

More specifically, it is a purpose of the invention to provide an improved automatic toaster having thermally responsive timing means including a temperature responsive member affecting the time period provided thereby, which member is subject to the heat of the toaster heating elements and is so located that substantially uniform toasting of successive bread slices in the toaster results.

Also, the invention contemplates an improved automatic toaster provided with timing means including a thermally responsive member affecting the time period provided by the timing means, which member is subject to the heat of the toaster elements and is located so as to be traversed by an appreciable amount of convection currents produced by the toaster heating means and flowing in a predetermined path, preferably the main draft of an upright oven type toaster passing through the toasting space.

While the invention is not limited thereto in its broader aspects, the preferred form of toaster contemplated by this invention and herein illustrated and described, is an upright oven type of toaster under the control of thermally responsive timing means comprising in this case a variable speed timer and a regulating thermostat directly exposed to the radiant heat of the heating elements and located in the main air draft passing through the toasting space.

The above features of the invention and various others will become more readily apparent upon a detailed study of the accompanying drawings and specifications together with the appended claims, it being understood that various modifications of the invention may be made within the scope of the claims.

In the drawings, which show but one toaster and are merely illustrative of my invention, Figure 1 is a longitudinal cross sectional view through the toaster along line 1—1 of Figure 4;

Figure 3 is a longitudinal cross section along the line 3—3 of Figure 4;

Figure 4 is a transverse cross section along the line 4—4 of Figure 3;

Figure 5 is an end view of the timing mechanism;

Figure 6 is a side elevation of the timing mechanism;

Fig. 10 is a view of the toaster in front elevation, some parts being broken away.

Figure 1:
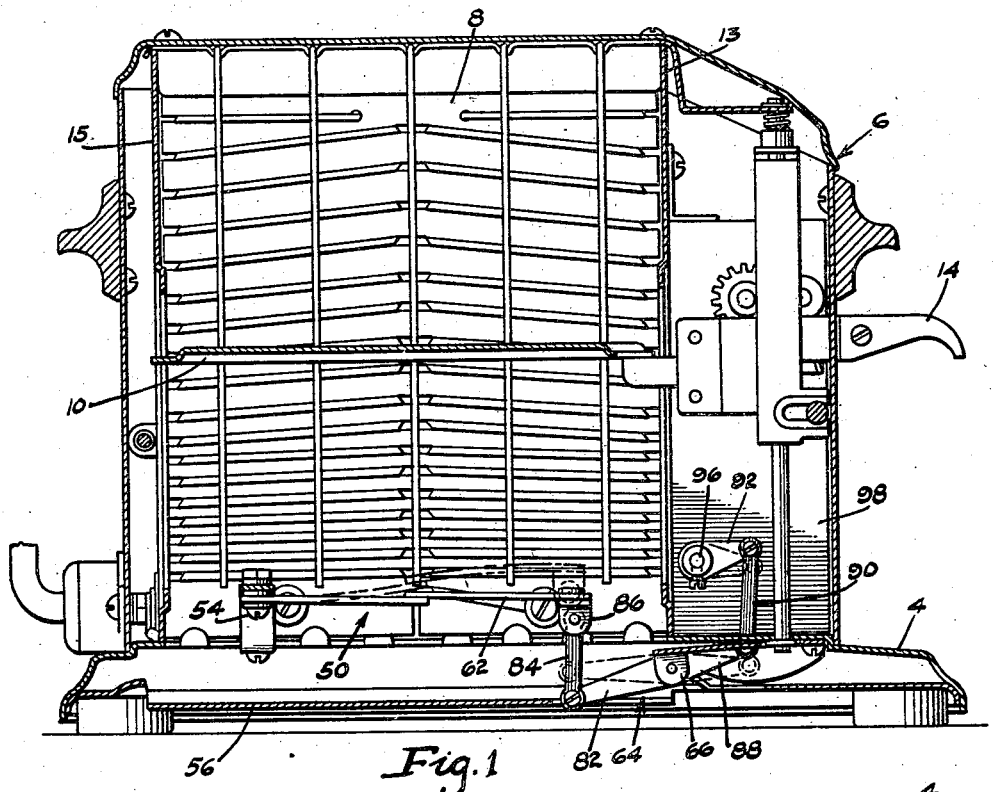

Referring more particularly to the drawings, there is shown an automatic toaster having a base member 4 formed of stamped sheet metal and having an outer casing generally designated by 6 mounted thereon. Within the casing 6, which is also formed of stamped sheet metal, there are arranged a pair of heating elements 8 between which bread slices to be toasted are moved by a bread carrier 10. Preferably sheet metal walls 12 separate the heating elements from the outer metallic casing 6. The toasting chamber or oven is formed by the side walls 12 and the front and rear sheet metal end walls 13 and 15.

A handle 14 extends outside of the casing 6 and has mechanism associated therewith for winding a timing mechanism constituting a variable speed clock shown more particularly in Figures 5 to 9, and for depressing the bread carrier 10. The specific structures will not be described in detail inasmuch as they form no part of the present invention and are fully described in the pending patent application of Murray Ireland, entitled "Toaster", Serial Number 437,071, filed on March 19, 1930, now Patent No. 2,001,362; and U. S. Patent No. 1,866,808 to Ireland. The first mentioned patent shows the various details of the toaster and the second patent fully discloses the timing mechanism.

In the operation of the toaster, a bread slice is placed upon the carrier 10 while the same is in the uppermost position shown in Figure 1. The handle 14 is then depressed, whereupon the carrier 10 is moved into lowermost position and the bread is moved into toasting position between the heating elements 8. In the course of the downward movement of the handle, a main switch 16 for the heating elements is automatically closed and when the carrier reaches lowermost position it is held therein by a catch member later released by the timing mechanism. Upon subsequent release of the catch member, the bread carrier is moved into the uppermost end position of ejection or reception shown in Figure 1 by means of the spring 18 and leverage system generally designated at 21 whereupon the operator may remove the bread slice. During the upward movement of the bread carrier the main switch 16 for the electrical heating elements 8 is also opened in known manner.

The spring of the variable speed timing mechanism is wound by means of a rack 20 which is provided with a pin 22 engaged by a member 24 fixed on a slide 26 to which the handle 14 is attached. When the handle is depressed the lower surface of the member 24, which is preferably V shaped, engages the pin 22 and pulls down the rack 20 thereby rotating the spring shaft 28 and energizing the spring 30 of the timing mechanism. As the spring unwinds it raises the rack 20 thereby also raising the slide 26 and member 24, the latter being provided with an upper cam surface which engages the catch for holding the bread carrier in lowermost position to release the same after a predetermined amount of travel and thereby terminate the toasting of the bread slice. By varying the speed with which the spring unwinds and the clock mechanism raises the rack 20, the time during which the bread carrier holds the bread in position to be toasted between the heating elements are energized, may thus be governed.

Figure 7:
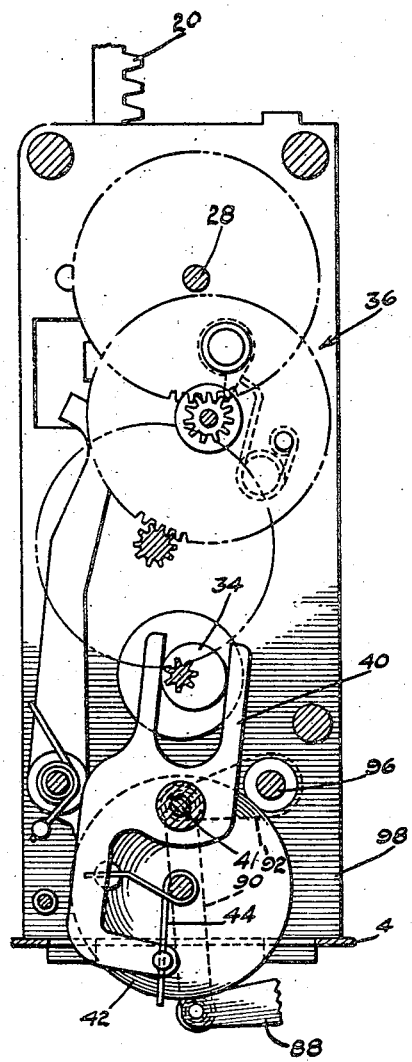
Figure 7 is a cross section along the line 7—7 of Figure 5, the oscillator being shown adjusted into position to speed up the timing mechanism and thus shorten the period of operation.
Figure 8:
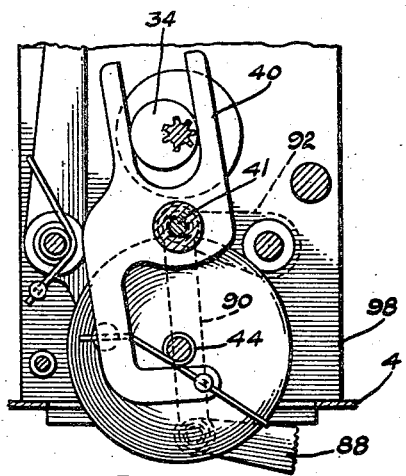
Figure 8 is a fragmentary view along the lines of Figure 7, the oscillator being shown adjusted to decrease the speed of the mechanism and thereby increase the period of operation.
Figure 9:
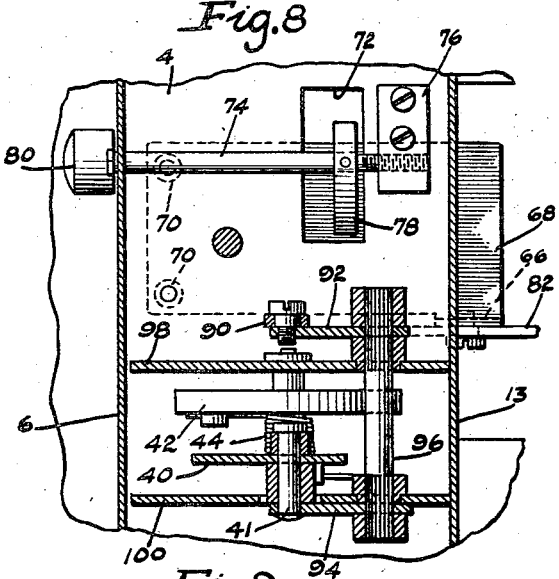
Figure 9 is a fragmentary view showing a cross section along the line 9—9 of Figure 4.

As the spring 30 unwinds, it rotates a shaft 32 having a cam 34 fixed thereon, by means of a gear train generally designated at 36. The cam 34 operates within the forked end of an oscillator 40 which is pivotally mounted on a pin 41 and has one end attached to a balance wheel 42 by means of a spring 44. By varying the position of the pivoted oscillator 40 with respect to the cam 34 and balance wheel 42, the speed of the timing mechanism may be varied. Figure 7 shows the oscillator so positioned that the timing mechanism will operate at relatively great speed and it will require a relatively small amount of time for the member 24 associated with the operating handle to be raised by means of a rack 20 from lowermost position into position to trip the catch for the bread carrier. Figure 8 shows the parts so adjusted that the speed of the timing mechanism is reduced whereby a greater time interval is consumed before the bread carrier is released.

It will be noted that variation of the position of pin 41 upon which the oscillator 40 is mounted, results in a variation of the time during which the bread carrier 10 holds a bread slice within the oven, and during which the heating elements are energized.

In the Ireland patents above referred to there are provided manual means for adjusting the position of the oscillator 40 so as to vary the speed of the timing mechanism. In accordance with the present invention, however, means are provided for automatically positioning the oscillator 40 in accordance with toaster temperature conditions whereby the speed of the timing mechanism, and consequently the time interval during which the bread carrier is retained in lowermost position, will be caused to vary depending upon the prevailing conditions of temperature. That is to say, the oscillator 40 is automatically moved in the direction of the cam 34 when the oven is cool whereby the bread carrier is retained in lowermost position within the oven for a relatively great amount of time as previously explained. As the oven reaches higher temperatures the oscillator is automatically moved away from the cam 34 so that the speed of the timing mechanism is increased and the time interval during which the carrier is retained in lowermost position for any given toasting operation is correspondingly reduced. The speed of the variable speed clock varies directly as the toaster temperature and the toasting intervals vary inversely.

Figure 2:
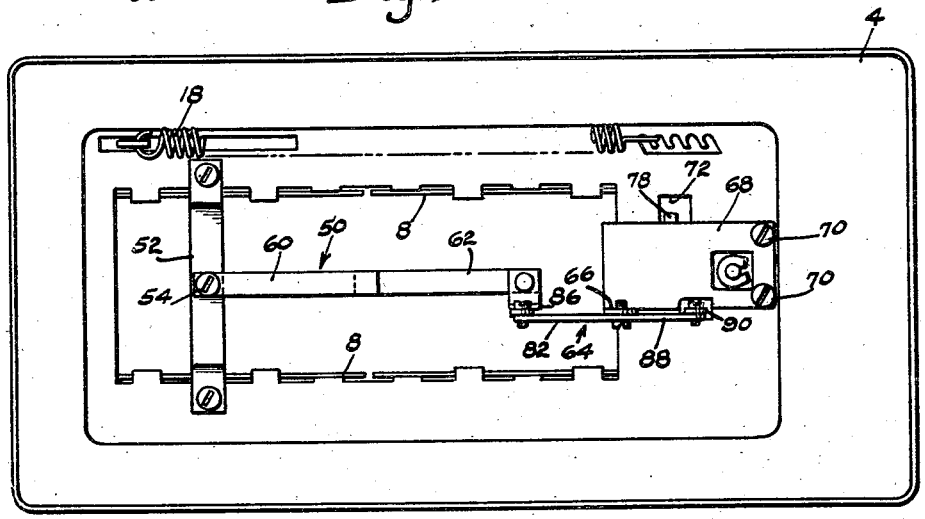
Figure 2 is a bottom plan view of the toaster with its lower guard plate removed.

The means for automatically varying the position of oscillator 40 will now be described. These means include a thermobar generally designated at 50 which is mounted at one end upon a metallic strip 52 extending transversely across the bottom of the oven of the toaster. The metallic strip 52 is of substantially the same thickness and possesses substantially the same cooling qualities as the base member 4 and the other sheet metal parts of the toaster. Preferably, the metallic support 52 is also of the same thickness as the sheet metal walls 12, 13, and 15 forming the sides of the oven. The thermobar 50 has one end attached to the metallic strip 52 by means of a nut and bolt assembly 54 and extends longitudinally of the toaster. As will be evident from Figures 1 and 2, the thermobar 50 is fully exposed throughout its length to the oven draft or air currents entering through the openings provided in the lower guard plate 56 of the toaster. Also, it is exposed to the radiant heat emanating from the heating element as will be evident from Figures 1 and 2.

The thermobar 50 is composed of a first portion 60 which is secured to the metallic support 52, and a second portion 62 which is welded to the free end of portion 60 and comprises a continuation thereof. The broken line position of the thermobar which is shown in Figure 1 illustrates the same when heated and the full line position shows the thermobar when cool, i. e. at room temperature. As will be evident from Figure 1, the portion 60 of the thermobar tends to warp upwardly upon being heated whereas the portion 62 of the thermobar tends to warp downwardly, thus partially compensating for the movements of portion 60. If desired a straight continuous thermobar may be used in place of the compensated one although the latter is preferred.

A fulcrumed lever generally designated at 64 is pivotally connected to a down-turned lug 66 formed integrally with a plate 68 of spring steel. The spring steel plate 68 is secured at one end to the underside of base member 4 by means of screws or bolts 70 but its opposite end, adjacent which the down-turned lug 66 is formed, is not secured to the base member in any way. As clearly shown in Figure 9 the upper horizontal surface of the base member 4 is provided with an opening 72 which exposes the spring plate 68. In order to enable adjustment of the free end of the spring plate 68 with respect to the base member 4 there is provided a rod or shaft 74 which is journaled in a block 76 fixed to the upper surface of the base member 4. Secured to the rod 74 and opposite the opening 72 is a cam 78 which passes through the opening 72 and engages the spring plate 68. The rod 74 extends outside of the main casing 6 of the toaster and is provided with a knob 80 by means of which it may be manually rotated, whereupon the cam 78 will vary the position of the free end of spring plate 68 and will consequently vary the position of the lug 66 forming a support for the fulcrumed lever 64. Any convenient means may be provided for retaining the rod 74 in any selected position.

The free end of the arm 82 of the fulcrumed lever 64 is pivotally connected to a link 84 which in turn is pivoted to a bracket member 86 fixed to the free end of portion 62 of the thermobar 50. The free end of arm 88 of the lever 64 is pivoted to a link 90 whose opposite end is pivoted to the arm 92 of a yoke which also has a second arm 94. The arms 92 and 94 are located on opposite sides of the timing mechanism and are both fixed to a pin 96 which is journaled in and extends through the walls 98 and 100 of the timing mechanism. Fixed to the arm 94, which forms part of the aforementioned yoke, and extending through an opening formed in the wall 100 is the pin 41 upon which the oscillator 40 of the timing mechanism is pivoted as previously explained. In Fig. 10, 6a indicates an opening in the top of the casing 6 through which bread will be inserted and through which the hot air passes freely upward through the toasting chamber or oven.

In operation, a slice of bread is inserted upon the bread carrier 10 when it is in raised position as shown in Figure 1. The handle 14 is moved into lowermost position whereby the spring of the clock mechanism is wound and the bread carrier is retained in lowermost position by means of a latch mechanism. Also, the energizing circuit for the toaster heating elements 8 is closed. Assuming that the toaster is entirely cold, the thermobar 50 will be in the full line position shown in Figure 1 with the result that the arm 92 of the supporting yoke for pin 41 will be in raised full line position, and the oscillator 40 will have a position relatively close to the cam 34. Consequently, the timing mechanism will operate slowly and a relatively great time interval will pass before the rack 20 has been raised a sufficient amount by the timing mechanism to trip the latch which holds the bread carrier 10 in lowermost position. At the start of the operation the various parts will be in the positions above described but it will of course be understood that as the toaster becomes heated, the thermobar will become correspondingly hotter, and the pin 41 will automatically move the oscillator 40 further away from the cam 34, thereby increasing the speed of the timing mechanism. Thus, at the end of the toasting of the first slice, the speed of the timing mechanism will be greater than it was at the beginning of the operation but the parts are so designed that the average time, i. e. the time during which the bread carrier keeps the bread within the oven, is just sufficient to toast the bread slice the desired amount under the temperature conditions prevailing in the oven. That is to say, the action of the thermostat is correlated with the regulating means provided with the variable speed clock.

If a second slice of bread is now inserted upon the bread carrier 10 before the oven is allowed to cool, the thermobar 50 will be somewhat heated and will be warped, for instance into the dotted line position shown in Figure 1. In this position, the thermostat will operate by means of the link mechanism to hold oscillator 40 away from the cam 34 as previously explained, and the speed of the timing mechanism will be correspondingly increased with the result that the bread carrier will hold the bread within the oven a shorter time than it did during the toasting of the first slice. Since the oven is at a higher temperature the bread will therefore be toasted to the same degree as the first slice was toasted, even though it was exposed to the heat for a shorter interval of time. With succeeding slices, the thermobar 50 will automatically regulate the timing mechanism so that the bread will be retained in the oven an amount of time depending upon the temperature conditions therein. Thus, completely uniform toast will be obtained irrespective of the starting conditions of temperature within the oven and irrespective of periods of waiting between the toasting of successive slices.

Assuming, for example, that three or four slices have been toasted in rapid succession and that the operator then waits several minutes before inserting the next slice, it will be seen that the thermobar 50 will accurately respond to the oven temperature at the end of this interval of waiting. When the energizing circuit for the heating elements is broken the toaster begins to cool but a draft will nevertheless be maintained through it as long as it retains any heat. This draft or flow of air, which sweeps through the oven and acts to cool the same, also sweeps over the exposed surfaces of the thermobar 50 and its mounting 52 thereby cooling these members a proportionate amount.

By adjusting the knob 80 it is possible to regulate the toaster to produce toast having any desired degree of crispness. If it is desired to produce toast that is well done or dark, the knob 80 is manipulated in such direction that the cam 78 will operate to allow the spring plate 68 to move closer to the base member 4. As a result of such movement the fulcrumed lever 64 will be also moved in the same direction and the pin 41 will consequently be moved in the direction of cam 34 thereby reducing the speed of the timing mechanism and increasing the time interval during which the bread slices are retained in the oven. On the other hand, if it is desired to produce lighter toast or toast which is less well done, the knob 80 is manipulated in such a way as to cause cam 78 to move the free end of spring plate 68 further away from the base member 4. Such movement results in a moving of the pin 61 carrying the oscillator 40 in a direction away from cam 34 with the result that the speed of the timing mechanism is increased and the time interval during which bread slices are retained in the oven are correspondingly decreased. The toaster is purely automatic and will operate to uniformly toast bread slices to any desired degree, depending upon the setting of knob 80, irrespective of initial oven temperatures and irrespective of the duration of time intervals between successive toasting operations.

While the aforegoing embodiment of the invention constitutes a toaster including electrical heating elements and wherein the toasting of the bread slice is terminated both by turning off the heating means and removing the bread slice therefrom, it will be understood that any desired type of heating elements as for example, gas burners may be employed and that it is further within the purview of the invention that any desired means may be associated with the thermally responsive device to control the toasting operation. To illustrate, the device may be used to control the degree of heating of the element, or may operate to terminate the toasting operation by solely removing the bread slice from the heating element or solely rendering them inoperative as desired. Also, it is noted that those claims directed to an air "draft" or "convection currents" are not intended to be limited to the specific type of upright toaster here shown but cover any type of toaster embodying the various claimed elements including a controlling thermostat exposed in convection currents produced by the heating means irrespective of whether such currents represent the main draft as in the herein described example, or an auxiliary draft or air current.

I claim as my invention:

1. In an intermittently operated automatic toaster, heating means, means for supporting a bread slice in position to be toasted by said heating means, controllable means for terminating the toasting of the slice, and a thermally responsive device controlling the operation of the terminating means, said device being fixedly secured with respect to the toaster and positioned so as to be removed from the bread slice and subject to heat given off by said heating means, and also being so located as to be exposed to a flow of air exerting a cooling action thereon and which is continuously supplied to the toaster from outside thereof by convection currents resulting from the heat of said heating means, said flow of air being operative to exert a cooling action upon the thermally responsive device during cooling of the heating elements between successive toasting operations thereby to cause said thermally responsive device to closely follow oven temperature conditions of the space occupied by the bread while being toasted and insure uniform toasting of successive slices of bread in said toaster under all conditions.

2. In an upright automatic toaster, a casing provided with openings at the bottom and top thereof permitting circulation of air therethrough, heating means in the casing, means for supporting a bread slice in the casing in position to be toasted by said heating means, time controlled means for terminating the toasting of the slice, and a thermally responsive device removed from the bread slice and subject to heat given off by said heating means, and also exposed in a cooling vertical air draft passing through the said openings and created by the heat given off by said heating means, said thermally responsive device controlling the time period provided by said time controlled terminating means thereby to vary the toasting interval in accordance with changes in its temperature.

3. In an automatic toaster, heating means, a casing for the heating means enclosing a toasting spaced and provided with openings through which an air draft of appreciable size passing through the toasting space is set up by the heating means, means for supporting a bread slice being toasted by said heating means, a thermally responsive device mounted to be traversed by said draft before it enters the toasting space and subject to heat from the heating means, and controllable means for controlling the toasting of the bread slice, said last said means being under the control of said thermally responsive device.

4. In an automatic toaster, heating means, means for supporting a bread slice in position to be toasted by said heating means, a thermally responsive device freely exposed to the radiant heat given off by said heating means and also freely exposed in an air draft created under the influence of heat from the heating means, and controllable means for terminating the toasting of the bread slice, said terminating means being under the control of said thermally responsive device.

5. In an automatic toaster of the oven type, having an opening enabling circulation of air therein from the outside thereof, heating means, means for supporting a bread slice in position to be toasted by said heating means, controllable means for terminating the toasting of the slice by rendering the heating means inoperative, and a thermally responsive device removed from the bread slice and subject to heat given off by said heating means, and also being so located as to be exposed to an appreciable flow of air continuously supplied to the toaster from the outside atmosphere through said opening by convection produced by the heat of the heating means, said flow of air exerting a cooling action upon the thermally responsive device during cooling of the heating elements between successive toasting operations whereby the temperature of said device more quickly follows changes in oven temperature, said thermally responsive device controlling the operation of the terminating means for every toasting operation to vary the toasting interval in accordance with changes in its temperature and insure substantially uniform toasting of successive slices of bread in said toaster under all conditions.

6. In an automatic toaster, heating means, controllable means for moving a bread slice to be toasted to and away from position to be toasted by said heating means, and a thermally responsive device subject to heat given off by the heating means and located in a cooling draft of air from outside the toaster set up by circulation induced by the heating means, said thermally responsive device having a fixed connection with the toaster and controlling the operation of the bread moving means thereby to vary the toasting interval in accordance with changes in its temperature and insure substantially uniform toasting of successive slices of bread in said toaster under all conditions.

7. In an automatic toaster, heating means, means for supporting a bread slice in position to be toasted thereby, a timer, means controlled by the timer for terminating the toasting of the bread slice, and a thermostat fixedly secured with respect to the toaster and subject to heat from the heating means and also located in an air draft set up thereby, said thermostat controlling the time period provided by the timer for every toasting operation thereby to vary the toasting interval in accordance with changes in its temperature, and said air draft being operative to so affect the temperature of the thermostat as to cause uniform toasting of successive slices of bread in said toaster under all conditions.

8. In an automatic toaster, heating means, means for supporting a bread slice in position to be toasted by said heating means, a variable speed clock, means associated with said clock for automatically terminating the toasting of the bread slice, and means including a thermally responsive device removed from the bread and subject to heat given off by said heating means and located in an air draft created thereby for automatically regulating the speed of said clock.

9. In an automatic bread toaster having heating means, means for supporting a bread slice being toasted by said heating means, a thermostat exposed to the radiant heat given off by the heating means, a variable speed clock, means connecting the thermally responsive device and variable speed clock for regulating the speed of the latter in accordance with temperature fluctuations of the former, and means associated with said variable speed clock for terminating the toasting of the bread slices.

10. An automatic toaster comprising heating means, means for moving a bread slice into and away from position to be toasted by said heating means, a variable speed clock controlling said moving means, and a thermally responsive device subject to heat given off by said heating means and exposed in convection currents created thereby, said thermally responsive device being operatively connected to said variable speed clock to regulate the same.

11. An automatic toaster comprising heating means, means for moving a bread slice into and away from position to be toasted by said heating means, a variable speed clock controlling said moving means, and a thermally responsive device exposed to radiant heat given off by said heating means and also exposed in convection currents created thereby, said thermally responsive device being operatively connected to said variable speed clock to regulate the same.

12. In an automatic toaster, heating means, means for supporting a bread slice in position to be toasted by said heating means, controllable means for terminating the toasting of the slice, and a thermostat having one portion thereof adapted to warp in one direction and another portion adapted to warp in an opposite direction, said thermostat being subject to heat given off by said heating means and exposed to a cooling air draft created thereby, said thermostat controlling the operation of the terminating means thereby to vary the toasting interval in accordance with changes in its temperature.

13. An automatic toaster comprising heating means, means for supporting a bread slice in position to be toasted by said heating means, means for terminating the toasting of said bread slice, a variable speed clock controlling said terminating means, and a thermally responsive device subject to heat given off by said heating means and also exposed in convection currents created thereby, said thermally responsive device being operatively connected to said variable speed clock to regulate the same.

14. In an intermittently operated oven type automatic bread toaster, heating means, means for supporting a bread slice being toasted by said heating means, means for terminating the toasting of the bread slice, and a thermally responsive timing means controlling said terminating means and thereby determining the duration of the toasting interval, the temperature responsive portion of said timing means being removed from the bread slice and subject to heat given off by said heating means, and also being so located as to be exposed to a flow of air exerting a cooling action thereon and which is continuously supplied to the toaster from the outside thereof by convection currents resulting from the heat of the heating means, said flow of air being operative to exert a cooling effect upon said temperature responsive portion during the cooling of the heating elements between successive toasting operations thereby to cause the said temperature responsive portion to closely follow oven temperature conditions and insure uniform toasting of successive slices of bread in said toaster under all conditions.

15. In an automatic bread toaster, heating means, means for supporting a bread slice being toasted by said heating means, a thermostat responsive to the heat given off by the heating means directly exposed to the radiant heat thereof and located in an air draft produced thereby, a variable speed timing mechanism, means connecting said thermostat and variable speed timing mechanism for regulating the speed of the latter in accordance with temperature fluctuations of the former, and means associated with said variable speed timing mechanism for terminating the toasting of the bread slice.

16. In an automatic toaster, heating means, means for supporting a bread slice in position to be toasted thereby, a timer for providing a time period, means controlled by the timer for terminating the toasting of the bread slice, and a thermostat exposed to the radiant heat of the heating means and also located in an air draft set up thereby, said thermostat controlling the time period provided by the timer thereby to vary the toasting interval in accordance with changes in its temperature.

17. In an automatic toaster, heating means, means for supporting a bread slice in position to be toasted by said heating means, a timer for providing a time period, means controlled by the timer for terminating the toasting of the bread slice, and a thermostat subject to heat from the heating means and also located in an air draft set up thereby, said air draft being operative to cause the thermostat to closely follow the toaster temperature and controlling the time period provided by the timer thereby to vary the toasting interval in accordance with changes in its temperature and insure uniform toasting of successive bread slices in the toaster under all conditions.

18. In an automatic toaster, heating means, means for supporting a bread slice in position to be toasted by said heating means, a timer for providing a time period, means controlled by the timer for terminating the toasting of the bread slice, a thermostat subject to heat from the heating means and also located in an air draft set up thereby, said thermostat closely following the toaster temperature and controlling the time period provided by the timer thereby to vary the toasting interval in accordance with changes in its temperature, and means for manually regulating said timer independently of said thermostat.

19. In an automatic bread toaster having heating means, means for supporting a bread slice being toasted by said heating means, a thermally responsive device directly exposed to the radiant heat given off by the heating means, a variable speed clock, means connecting the thermally responsive device and variable speed clock for regulating the speed of the latter in accordance with temperature fluctuations of the former, means associated with said variable speed clock for terminating the toasting of the bread slices, and means for manually regulating the speed of the variable speed clock independently of said thermostat.

20. An automatic toaster comprising heating means, means for supporting a bread slice in position to be toasted by said heating means, means for terminating the toasting of said bread slice, a variable speed clock controlling said terminating means, a thermally responsive device subject to heat given off by said heating means and also exposed in convection currents created thereby, said thermally responsive device being operatively connected to said variable speed clock to regulate the same, and means for manually regulating the speed of said variable speed clock independently of said thermally responsive device.

21. A cooking device of the character described having a heating chamber comprising a cooking compartment, a variable speed clock mechanism for timing the operation of said cooking device, and a thermally responsive member positioned directly within said cooking compartment and operatively connected with said clock mechanism for controlling the speed thereof.

22. A cooking device comprising a cooking chamber, a timing means comprising a clock mechanism for timing the operation of said device, and a thermally responsive member for varying the time period provided by said timing means in accordance with the temperature affecting the said member, the said member being located in a position where it will be affected by the heat within the cooking chamber to substantially the same degree or manner as the material being cooked therein.

23. A cooking device of the character described having a cooking chamber within which material is positioned to be cooked during the cooking operation of said device, means comprising a timing device adapted to provide a time period for said operation and a thermally responsive member adjacent to and spaced from said material; the said member being subject substantially to the same heat and conditions affecting the said material during a heating operation of said device and operatively connected with said timing device to automatically vary the length of said time period.

24. In an automatic toaster, heating means, means for supporting a bread slice in position to be toasted by said heating means, a variable speed clock, means associated with said clock for automatically terminating the toasting of the bread slice, and means including a thermally responsive device removed from the bread and subject to heat given off by said heating means and located in an air draft created thereby for automatically regulating the speed of said clock.

25. In an automatic toaster, heating means, means for supporting a bread slice in position to be toasted thereby, a timing mechanism, means controlled by the timing mechanism for terminating the toasting of the bread slide, and a thermostat exposed to the radiant heat of the heating means, said thermostat controlling the operation of the timing mechanism thereby to vary the toasting interval in accordance with changes in its temperature.

26. In an automatic toaster, heating means, means for supporting a bread slice in position to be toasted thereby, a timing mechanism, means controlled by the timing mechanism for terminating the toasting of the bread slice, and a thermostat exposed to the radiant heat of the heating means, said thermostat controlling the operation of the timing mechanism thereby to vary the toasting interval in accordance with changes in its temperature, and means for manually regulating said timing mechanism independently of said thermostat.

27. In an automatic toaster, heating elements spaced apart to provide a space for bread being toasted, a casing for said heating elements having openings through which a main air draft having appreciable size and passing through said bread toasting space is induced by the heat of the heating elements, and means for controlling the toasting of a bread slice in said bread toasting space including a thermally responsive member removed from the bread slice and subject to the heat of the heating elements and position to be traversed by said main air draft, said member being operative to insure substantially uniform toasting of successive slices of bread in said toaster.

28. An automatic toaster comprising heating means, means for causing an appreciable amount of convection currents produced by the heat of the heating means to flow in a predetermined path, a timer for providing a time period, means operatively connected to the timer for terminating a toasting operation at the expiration of the time period, and means including a thermally responsive member located in said path for varying the time period provided by said timer, said member being operative to insure uniform toasting of successive slices of bread in said toaster under all conditions.

29. In an automatic toaster, a casing, heating elements mounted in said casing in spaced substantially upright planes and providing a toasting space therebetween, means for controlling the toasting of a bread slice in said space, a thermally responsive member subject to the heat of the heating elements, and timer means for providing a time period associated with said thermally responsive member and operatively connected to said controlling means to institute operation thereof upon the expiration of the time period provided by the timer means, said casing having openings to provide an air draft continuously replenished by outside air and passing upwardly through said toasting space and said thermally responsive member being located so as to be traversed by said air draft, and said thermally responsive member being operative to vary the time period provided by said timer means to insure substantially uniform toasting of successive slices of bread in said toaster.

30. In an automatic toaster, heating means, means for supporting a bread slice in position to be toasted thereby, a timing mechanism, means controlled by the timing mechanism for terminating the toasting of the bread slice, and a thermostat exposed to the radiant heat of the heating means and likewise exposed to convection currents of appreciable size produced thereby and flowing in a predetermined path, said thermostat controlling the operation of the timing mechanism thereby to vary the toasting interval in accordance with changes in its temperature.

31. An automatic toaster comprising heating means, means for controlling a toasting operation, a timer for controlling said toasting operation control means, and a thermally responsive member operatively associated with said timer, to control the time period provided thereby, said thermally responsive member having two portions, one of which is movable to partially compensate for the movement of the other to thereby insure substantially uniform toasting of successive slices of bread in said toaster.

MAURICE H. GRAHAM.